United States Patent
Batta et al.

(10) Patent No.: US 9,560,579 B2
(45) Date of Patent: Jan. 31, 2017

(54) WIRELESS COMMUNICATION ROAMING WITH COEXISTING RADIO ACCESS TECHNOLOGIES

(71) Applicant: QUALCOMM Incorporated, San Diego, CA (US)

(72) Inventors: Kamal Teja Batta, Hyderabad (IN); Krishna Chaitanya Suryavenkata Emani, Hyderabad (IN); Chinamay Kumar, Hyderabad (IN); Anil Kumar Daga, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/558,332

(22) Filed: Dec. 2, 2014

(65) Prior Publication Data
US 2016/0157162 A1 Jun. 2, 2016

(51) Int. Cl.
| | |
|---|---|
| *H04W 4/00* | (2009.01) |
| *H04W 48/16* | (2009.01) |
| *H04W 36/08* | (2009.01) |
| *H04W 48/20* | (2009.01) |
| *H04W 84/12* | (2009.01) |

(52) U.S. Cl.
CPC ............ *H04W 48/16* (2013.01); *H04W 4/008* (2013.01); *H04W 36/08* (2013.01); *H04W 48/20* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 6,452,910 B1 * | 9/2002 | Vij | H04L 12/66 370/310 |
| 7,991,425 B2 | 8/2011 | Su et al. | |
| 2007/0183383 A1 * | 8/2007 | Bitran | H04W 88/06 370/338 |
| 2007/0275746 A1 * | 11/2007 | Bitran | H04W 16/14 455/509 |
| 2008/0101279 A1 | 5/2008 | Russell | |
| 2008/0293405 A1 | 11/2008 | Meyer | |

(Continued)

FOREIGN PATENT DOCUMENTS

WO  WO 2011123550 A1  10/2011

OTHER PUBLICATIONS

ISA/EPO, International Search Report and Written Opinion of the International Searching Authority, Intl. App. No. PCT/US2015/063186, Feb. 12, 2016, European Patent Office, Rijswijk, NL, 16 pgs.

(Continued)

*Primary Examiner* — Erika Washington
(74) *Attorney, Agent, or Firm* — Holland & Hart LLP

(57) ABSTRACT

Methods, systems, and devices are described for wireless communications. More particularly, the described features relate to techniques for adaptively or dynamically setting a roaming threshold for a wireless communication link over a first RAT based at least in part on an aspect of a coexisting wireless communication link over a second RAT. In one example, a mobile device may have coexisting wireless communication links over WLAN and BT. In such case, a WLAN roaming threshold may be set based at least in part on a type of BT device employed.

30 Claims, 14 Drawing Sheets

(56) References Cited

U.S. PATENT DOCUMENTS

| | | |
|---|---|---|
| 2010/0130129 A1 | 5/2010 | Chang et al. |
| 2013/0150012 A1 | 6/2013 | Chhabra et al. |
| 2013/0169481 A1 | 7/2013 | Takatsuka et al. |
| 2014/0228038 A1 | 8/2014 | Kella et al. |
| 2014/0334293 A1 | 11/2014 | Narasimha et al. |

OTHER PUBLICATIONS

IPEA/EP, Second Written Opinion of the International Preliminary Examining Authority, Int'l Application No. PCT/US2015/063186, Oct. 26, 2016, European Patent Office, Munich, DE, 5 pgs.

\* cited by examiner

WIRELESS COMMUNICATION ROAMING WITH COEXISTING RADIO ACCESS TECHNOLOGIES

FIELD OF THE DISCLOSURE

The following relates generally to wireless communication, and more specifically to roaming in a device supporting multiple coexisting radio access technologies (RATs).

DESCRIPTION OF RELATED ART

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations or access points, each simultaneously supporting communication for multiple mobile devices. Access points may communicate with mobile devices on downstream and upstream links, and each access point has a coverage range.

A mobile device may establish a wireless communication link with the system via one of the access points and may change physical location while maintaining the link. Movement of the mobile device may trigger roaming for maintaining the link, for example, based at least in part on degradation of the link. The mobile device may employ a roaming algorithm to select between available access points for the link. The roaming algorithm may determine which access point currently has a best or suitable signal quality (e.g., based at least in part on a suitable parameter, such as received signal strength, etc.) and the mobile device may switch to the selected access point to improve performance of the wireless communication link.

When a mobile device supports wireless communications over multiple concurrent radio access technologies (e.g., wireless local area network (WLAN), BLUETOOTH® (BT or Bluetooth), wide area network (WAN), Long Term Evolution (LTE), etc.), various techniques may be employed to enable coexistence of the RATs so that operations over one RAT do not adversely impact operations over another RAT. One situation in which degradation and potential loss of connectivity may occur involves concurrent operation of a mobile device over WLAN for data communications and over BT for voice communications.

SUMMARY

The described features generally relate to one or more systems, methods, or apparatuses for wireless communications. More particularly, the described features relate to techniques for adaptively or dynamically setting a roaming threshold for a wireless communication link over a first RAT based at least in part on an aspect of a coexisting wireless communication link over a second RAT. A mobile device may have coexisting wireless communication links, for example, over WLAN and BT. A roaming threshold for the WLAN link may be set based at least in part on a type of BT device employed for the BT link.

A method for wireless communications is described. The method may involve determining by a first device a type of a second device coupled to the first device by a first wireless communication link, wherein the first device also is coupled to a third device by a second wireless communication link. A roaming threshold value for the second wireless communication link may be set based at least in part on the type of the second device. The roaming threshold may be used for determining whether the first device should attempt to roam from the second wireless communications link.

The method may be performed wherein the second device is a Bluetooth (BT) device, the second wireless communications link is part of a wireless local area network (WLAN), and the roaming threshold value is a WLAN roaming threshold value.

The method may involve setting the WLAN roaming threshold value for the second wireless communications link without regard to the type of BT device upon disconnect of the first wireless communications link.

The method may involve performing a WLAN roaming operation using the set roaming threshold value. The set roaming threshold value may be a received signal strength indicator (RSSI) value.

The method may involve determining a data rate using the type of BT device. The WLAN roaming threshold value may be based at least in part on the determined data rate.

Determining the data rate may be based at least in part on a synchronous connection oriented (SCO) window and SCO interval provided by the type of BT device.

The method may involve selecting a WLAN data rate from a plurality of data rates supported by an access point for the second wireless communications link. Such selection may be based at least in part on the determined data rate. Further, the WLAN roaming threshold value may be based at least in part on the selected WLAN data rate.

Determining the data rate may be based at least in part on a medium access control (MAC) packet data unit (MPDU) size and a WLAN time window provided by the type of BT device. For example, determining the data rate may involve determining a threshold data rate to transfer the MPDU over the second wireless communications link during the WLAN time window.

Determining the data rate may be based at least in part on a size of a fragment of a medium access control (MAC) packet data unit (MPDU) and a WLAN time window provided by the type of BT device. For example, determining the data rate may involve determining a threshold data rate to transfer the fragment over the second wireless communications link during the WLAN time window.

The method may involve setting the size of the fragment based at least in part on a current WLAN data rate for the second wireless communications link.

An apparatus for wireless communication is disclosed. The apparatus may include means for determining by a first device a type of a second device coupled to the first device by a first wireless communication link, wherein the first device also is coupled to a third device by a second wireless communication link. The apparatus also may include means for setting a roaming threshold value for the second wireless communication link based at least in part on the type of the second device. The roaming threshold may be used for determining whether the first device should attempt to roam from the second wireless communications link. The apparatus may include these or other elements configured to carry out various operations of the methods described above and herein.

Another apparatus for wireless communication is described. The apparatus may include a communications manager to determine a type of a second device coupled to the apparatus by a first wireless communication link, wherein the apparatus also is coupled to a third device by a second wireless communication link. The apparatus also may include a roaming manager to set roaming threshold value for the second wireless communication link based at least in part on the type of the second device. The roaming threshold may be used for determining whether the apparatus should attempt to roam from the second wireless communications link. The apparatus may include these or other elements configured to carry out various operations of the methods described above and herein.

A non-transitory computer-readable medium is described. The medium may store computer-executable code for wireless communications. The code may be executable by a processor to: determine by a first device a type of a second device coupled to the first device by a first wireless communication link, wherein the first device also is coupled to a third device by a second wireless communication link; and, set a roaming threshold value for the second wireless communication link based at least in part on the type of the second device. The roaming threshold may be used for determining whether the first device should attempt to roam from the second wireless communications link. The code may be executable by the processor to perform these or other various operations of the methods described above and herein.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
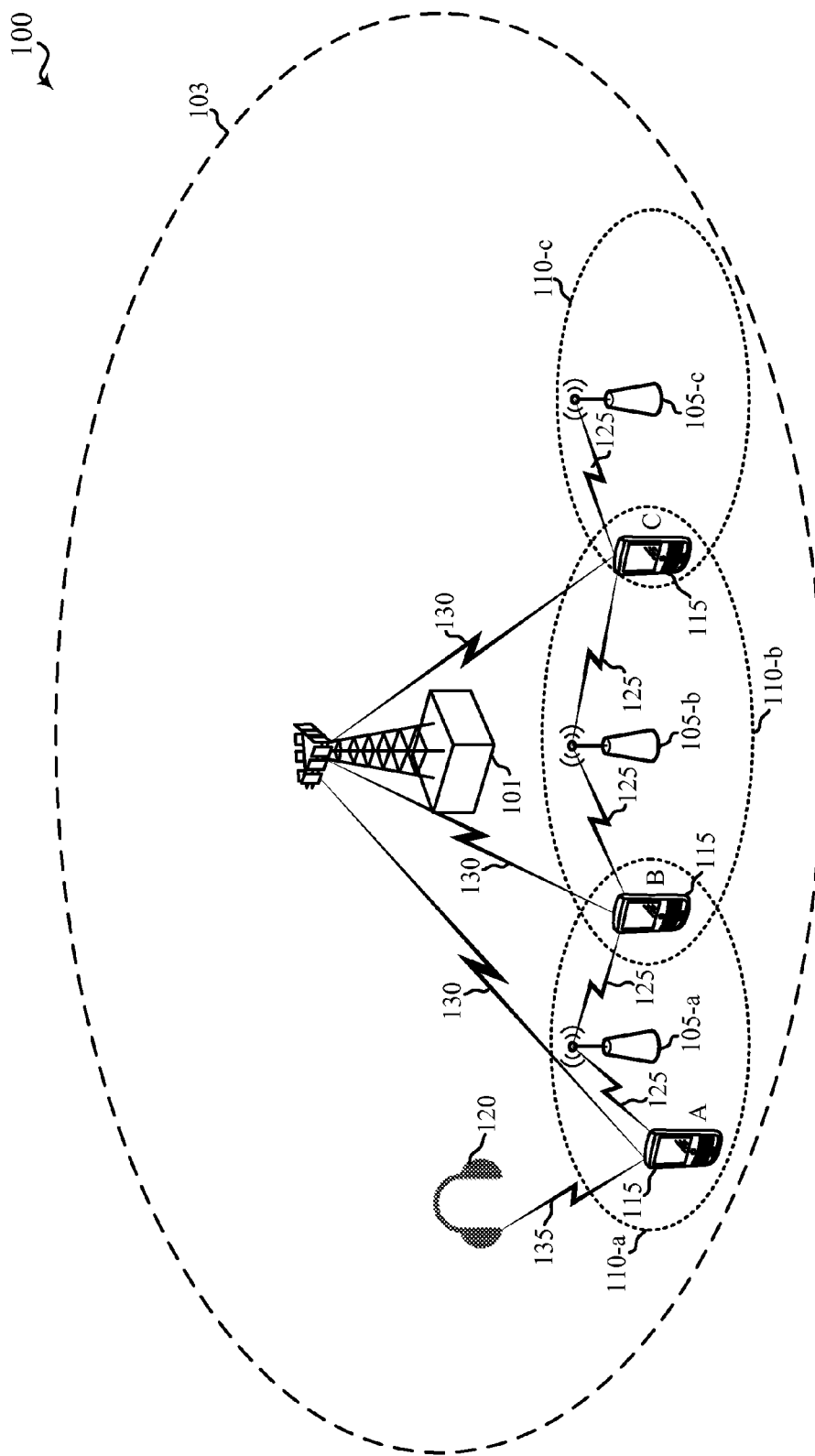
FIG. 1 shows a block diagram of a wireless communication system, in accordance with various aspects of the present disclosure.

The described features generally relate to one or more improved systems, methods, and/or apparatuses for wireless communication. A wireless communication device may have multiple coexisting radios for different radio access technologies (RATs) or may otherwise have multiple concurrent communication links over different RATs. For example, a wireless communication device may use one radio to send and receive WLAN communications, and another radio to route audio data to a Bluetooth (BT) headset. Alternatively, a wireless communication device may be configured for both WLAN communications and voice communications (e.g., voice over WiFi) using a common radio, while audio or other data is routed to a BT headset or other device. Further, a wireless communication device may have an integrated system on chip (SOC) for both WLAN (e.g., WiFi) and BT using the same radio. In such cases, coexistence of multiple RATs may raise significant interference issues.

In one scenario, a wireless communication device may be connected to a WLAN access point (AP) in an enterprise network and downloading data (e.g., a file) over the WLAN connection. Concurrently, the wireless communication device may handle voice calls with audio routed to a BT headset. An existing voice call routed via BT may cause performance degradation on WLAN, particularly as the user moves away from the WLAN AP. For example, throughput over WLAN may be significantly reduced, and worse, the WLAN AP connection may be lost (e.g., spiral to death).

Corrective measures may be employed to ensure successful roaming without unacceptable impact on WLAN throughput and connectivity. For example, a goal may be to reduce adverse impact on WLAN throughput and to avoid any impact on WLAN connectivity.

An approach described herein for maintaining acceptable WLAN throughput and maintaining WLAN connectivity for coexisting WLAN and BT involves adaptively or dynamically setting (e.g., selecting) a WLAN roaming threshold value based at least in part on a type of BT device (e.g., headset) employed. The WLAN roaming threshold value may be, for example, a received signal strength indicator (RSSI) value. The wireless communication device may have an established communication link with a current WLAN AP. As the wireless communication device is moved, the RSSI of the current WLAN AP may decrease to (or fall below) the RSSI roaming threshold value and trigger a scan to roam to an available candidate WLAN AP (e.g., one with an RSSI that is a certain decibel value greater than the RSSI value of the current WLAN AP).

Techniques described herein may be used for various wireless communications systems, including systems implementing radio access technologies (RATs) such as IEEE 802.11 Wireless Local Area Network (e.g., Wi-Fi), Bluetooth, and other radio access technologies operating in a shared or overlapping radio frequency spectrum. These techniques may also be applied to systems implementing a cellular radio access technology operating in the shared or overlapping radio frequency spectrum, or a cellular radio access technology that causes interference to the shared or overlapping radio frequency spectrum.

The following description provides examples, and is not limiting of the scope, applicability, or configuration set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Referring first to FIG. 1, a block diagram of a wireless communications system 100 in accordance with various aspects of the present disclosure is shown. The wireless communications system 100 may support multiple RATs, which may be coexist and may be employed concurrently by a wireless communications device (e.g., a smartphone). It should be understood that the wireless communications system 100 is described below in terms of specific RATs for the sake of clarity only, and that other combinations of RATs may be supported as well or instead.

For example, the wireless communications system 100 may include a plurality of WLAN access points 105, a number of stations (STAs) 115, and a cellular base station 101 (e.g., an LTE eNodeB). Some of the access points 105 may communicate with the STAs 115. The WLAN access points 105 may provide access to a first packet switched network (e.g., an intranet or the Internet) over a WLAN radio access technology, such as WiFi. The cellular base station 101 may provide access to a second packet switched network (e.g., a cellular core network, internet media services (IMS), or the Internet) over a cellular radio access technology, such as LTE.

The access points 105 may wirelessly communicate with the STAs 115 via access point antennas. Each of the access points 105 may provide communication coverage for a respective access point coverage area 110. An access point 105 may be a fixed access point, an ad hoc access point, or a peer-to-peer (P2P) group owner (GO). The access point coverage area 110 for an access point 105 may be divided into sectors (not shown). The access points 105 may be associated with the same or different access networks or operator deployments. Although three WLAN APs are illustrated, there may be any number (more or fewer) of such WLAN APs to allow WLAN roaming. Further, while overlapping coverage areas 110 are illustrated for two adjacent WLAN APs for simplicity, there may be various configurations of overlapping coverage areas such that the STA(s) may be within range of any number of WLAN APs at a given location.

The cellular base station 101 may also provide communication coverage for a respective cellular coverage area 103 (i.e., a cell). Although a single base station 101 of the cellular system is illustrated for simplicity, there may be any number of base stations 101 for the cellular system. The coverage areas 103, 110 of different access points 105 or cellular base stations 101, including the coverage areas of the same or different types of access points 105 or cellular base stations 101, utilizing the same or different radio technologies, or belonging to the same or different access networks, may overlap.

A STA 115 may also be referred to by those skilled in the art as a mobile device, a mobile station, a user equipment (UE), a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A STA 115 may include or be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A STA 115 may be able to communicate with the access points 105 and the cellular base station 101 using different radios. Accordingly, a STA 115 may also be able to communicate over different access networks, such as cellular or other WWAN access networks, or WLAN access networks.

The STAs 115 may communicate with the access points 105 using WLAN communications links 125 shown in wireless communications system 100, which may include uplinks for carrying uplink (UL) transmissions (e.g., from a STA 115 to an access point 105) or downlinks for carrying downlink (DL) transmissions (e.g., from an access point 105 to a STA 115). The UL transmissions may also be called reverse link transmissions, while the DL transmissions may also be called forward link transmissions. Similarly, the STAs 115 may communicate with the cellular base station 101 using a cellular communications link 130. The STAs 115 may further communicate with peripheral devices, such as a Bluetooth headset 120 over a Bluetooth communications link 135 or other communication link operating in the same radio frequency band as the access points 105-a or the cellular base station 101.

The APs 105 and the associated STA(s) 115 may represent a basic service set (BSS) or an extended service set (ESS). Each STA 115 in the network may be able to communicate with another STA 115 in the network through the one of the APs 105, or a combination thereof. Each of the APs 105 may be configured to broadcast downlink transmissions, including beacons, to the STA(s) 115 within its respective coverage area 110.

The three STAs 115 shown in FIG. 1 may represent a single STA 115 at different points in time as the STA 115 moves within the WiFi network, for example, from location A to location B to location C. As shown at location A, the STA 115 may establish a WLAN communications link 125 with WLAN (AP) 105-*a*, for example, for downloading data. The STA 115 also may establish a concurrent cellular communications link 130 with the cellular base station 101, for example, for voice communications. Further, the STA 115 may establish a concurrent BT communications link 135 with the BT headset 120 to route audio of the voice communications to the BT headset 120.

The STA 115 may move from location A to location B based on movement of the user. Although not shown for the sake of simplicity, the BT headset 120 may move along with the STA 115. Such movement may result in a change in a parameter of the WLAN communications link 125 provided by the AP 105-*a*, such as a decrease in the RSSI value. The change may trigger a scan by the STA 115 for candidate APs, and the STA 115 may roam to a candidate AP satisfying a certain criterion (e.g., a defined number of dB greater than the current WLAN communications link 125 with the AP 105-*a*). In this example, the scan may discover AP 105-*b* as a candidate. If AP 105-*b* satisfies the criterion (e.g., provides for better performance compared to the AP 105-*a*), the STA 115 may roam to the AP 105-*b*, establishing a WLAN communications link 125 therewith.

The STA 115 may continue to move from location B to location C. Similarly, such movement may result in a change in a parameter of the WLAN communications link 125 provided by the AP 105-*b*. The change may trigger a scan by the STA 115 for candidate APs, and the STA 115 may roam to a candidate AP satisfying the criterion. In this example, the scan may discover AP 105-*c* as a candidate. If AP 105-*c* satisfies the criterion, the STA 115 may roam to AP 105-*c*, establishing a WLAN communications link 125 therewith.

As discussed above, roaming of the STA 115 between WLAN APs 105 may suffer performance degradation due to BT communications with the BT headset 120. Thus, as discussed further herein, a WLAN roaming threshold may be set based at least in part on a type of the BT headset 120 to mitigate performance degradation and help avoid potential disconnection of the STA 115 from the WLAN system.

Figure 2A:
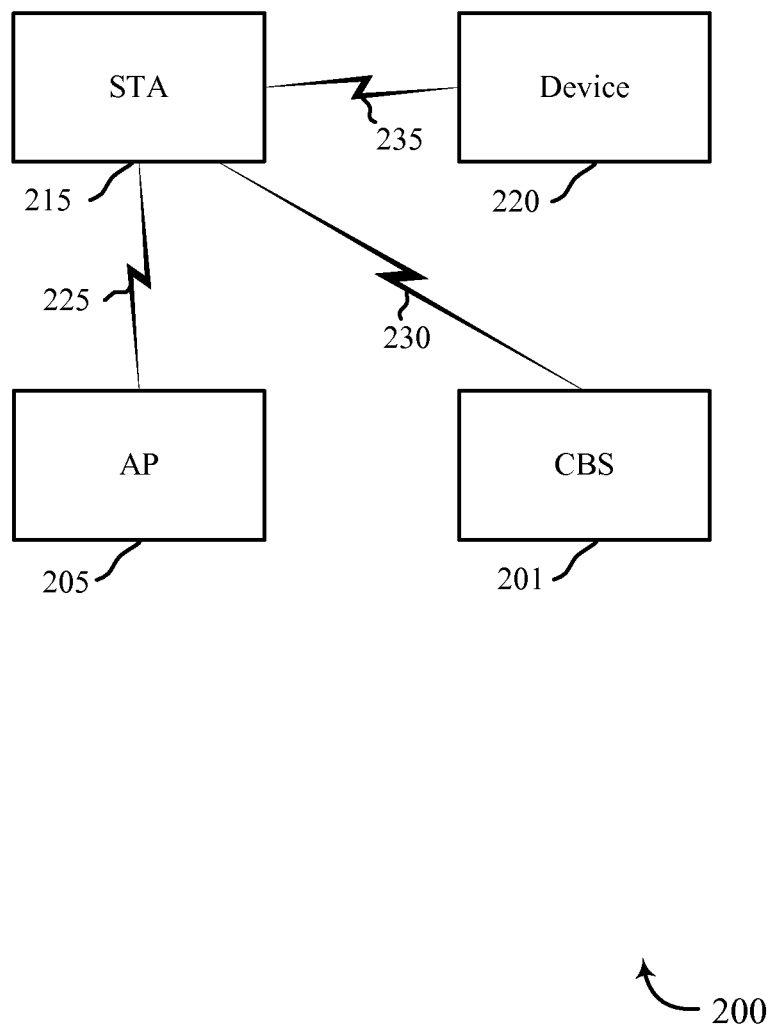
FIG. 2A shows a block diagram of another example of a wireless communications system, in accordance with various aspects of the present disclosure.

FIG. 2A shows a block diagram of another example of a wireless communications system 200 in accordance with various aspects of the present disclosure. The wireless communications system 200 may support multiple RATs, which may be coexist and may be employed concurrently by a wireless communications device (e.g., a smartphone). It should be understood that the wireless communications system 200 is described below in terms of specific RATs for the sake of clarity only, and that other combinations of RATs may be supported as well or instead.

The wireless communications system 200 may be an example of the wireless communications system 100 shown in FIG. 1. For example, the wireless communications system 200 may include a station (STA) 215, a WLAN access point (AP) 205, a cellular base station (CBS) 201, and an auxiliary device 220, such as a BT headset.

As illustrated, the STA 215 may establish a WLAN communications link 225 with the WLAN AP 205 for downloading a file, a cellular communications link 230 with the CBS 201 for voice communications, and an auxiliary communications link 235 (e.g., a BT link) with the auxiliary device 220 for routing audio of the voice communications to the auxiliary device 220. Alternatively, the STA 215 may not establish the cellular communications link 230 with the CBS 201. Rather, the STA 215 may be configured to handle voice communications via the WLAN communications link 225 with the WLAN AP 205 (e.g., configured for voice over WiFi) or may be configured to handle auxiliary communications from another auxiliary device (e.g., BT device, not shown) via the WLAN transceiver(s) of the STA 215 (e.g., using a BT alternate media access control (MAC)/physical (PHY) link or BT AMP link).

Regardless of the exact configuration, coexistence of communications over the auxiliary communications link 135 with the auxiliary device 220 and communications over the WLAN communications link 225 with the WLAN AP 205 may result in degradation of performance of the WLAN communications link 225 as the STA 215 roams to other WLAN APs (not shown). As described further herein, the STA 215 may implement an algorithm to dynamically set a WLAN roaming threshold based at least in part on a type of the auxiliary device 220, for example, when an active voice call session is established along with WiFi data traffic.

A first scenario may involve the STA 215 handling a voice call over WiFi (WLAN) with the audio thereof routed to the auxiliary device 220 and the user walking around. A second scenario may involve the STA 215 downloading a file over WiFi (WLAN) while also handling a voice call over a different RAT (e.g., BT) and the user walking around. In either scenario, both WLAN and the other RAT may concurrently use a same radio (e.g., 2.4 GHz) and may employ time division multiplexing (TDM) of the radio to share access to the wireless medium. In this case, an amount of time granted for WLAN transmission/reception may be based at least in part on the type of auxiliary device 220 being used.

Figure 2B:
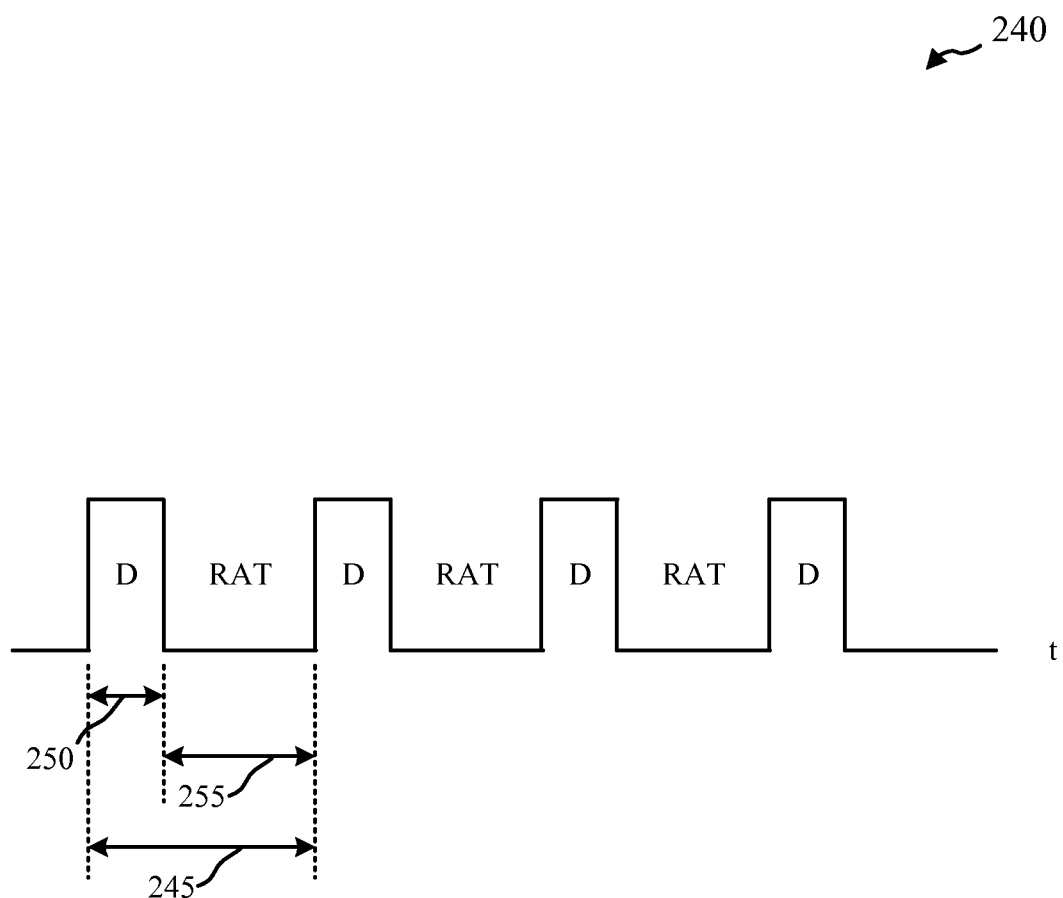
FIG. 2B shows a timing diagram of WLAN and BT time division multiplexing, in accordance with various aspects of the present disclosure.

For example, if the auxiliary device 220 is a synchronous connection oriented (SCO) BT headset, BT and WLAN may share the medium using TDM as illustrated by a timing diagram 240 shown in FIG. 2B. Although described in terms of WLAN and BT, it should be understood that the timing diagram 240 may represent TDM of various RATs and the RAT of the auxiliary device 220 (D).

An SCO interval 245 is 3.75 ms. One BT slot is 625 µs. For SCO, BT occupies a window 250 of two slots or 1.25 ms. The remaining time or WLAN window 255 is 2.5 ms. Thus, for BT SCO and WLAN reception traffic, WLAN may employ a power save (PS) poll mechanism to retrieve data from the WLAN AP 205, with the STA 215 sending a PS-Poll and receiving one MAC protocol data unit (MPDU) at a time in response. In such case, a successful WLAN reception may involve the STA 215 sending the PS-Poll, receiving an acknowledgement (ACK) of the PS-Poll from the WLAN AP 205, receiving the MPDU from the WLAN AP 205, and sending an ACK of the MPDU to the WLAN AP 205, all of which occurs within the WLAN window 255 of 2.5 ms.

A maximum size of an MPDU is conventionally about 1500 bytes or 12,000 bits. If a transmission data rate of the WLAN AP 205 is 6 megabits per second (Mbps), transmission/reception of such an MPDU would take 2 ms (12,000 bits/($6 \times 10^6$ bits/s)). As such, one MPDU may be received within the WLAN window 255 of 2.5 ms with the transmission data rate of the WLAN AP 205 being 6 Mbps, allowing for the PS-Poll and ACKs.

If the BT device 220 is an extended synchronous connection oriented (xSCO or eSCO) BT headset, the amount of time of the WLAN window may vary from 1.25 ms to 6.25 ms, depending, e.g., on the packet type used by the xSCO BT headset. Thus, different data transmission rates of the WLAN AP 205 may allow for one MPDU to be received by the STA 215, depending, e.g., on the particular BT device 220 (e.g., SCO, xSCO and packet type A, xSCO and packet type B, etc.).

An algorithm for dynamically setting a WLAN roaming threshold value may use information regarding the type of the BT device 220, such as the SCO/xSCO interval 245 and the BT window 250. The algorithm may involve calculating the time available for WLAN (e.g., the WLAN window 255) from such information. Alternatively, the time of the WLAN window may be predetermined (e.g., tabulated) for each type of BT device 220.

A size of an MPDU may be predetermined (e.g., fixed), or may be particular to the WLAN system. Thus, the STA 215 may know the size of the MPDU a priori or may be informed of the MPDU size by the WLAN AP 205 (e.g., broadcasting system information). Alternatively, a maximum size of an MPDU may be known and used by the algorithm.

The algorithm may involve determining a data rate based at least in part on the type of BT device 220. Data rates for different types of BT devices may be predetermined (e.g., tabulated) for a given MPDU size. Alternatively, the MPDU size may be used in conjunction with the calculated/determined WLAN window time to determine the data rate. For example, if the MPDU size is 12,000 bits and the WLAN window is 2.5 ms (as in the above example), then the data rate for transmission/reception of one MPDU is 4.8 Mbps (12,000 bits/(2.5×10$^{-3}$ s)).

The data rate calculated/determined for the type of BT device 220 may be considered to be a data rate to be maintained (e.g., a threshold data rate or a minimum data rate). As such, a WLAN roaming threshold value may be set or selected so that a roaming procedure is triggered well prior to degradation of the actual data rate to the calculated/determined data rate.

For example, a next available data rate may be selected from advertised data rates supported by the WLAN AP 205. In this example, the WLAN AP 205 may support data rates of 6 Mbps, 11 Mbps and 19.5 Mbps. From the calculated/determined data rate of 4.8 Mbps, the available data rate of 6 Mbps may be selected.

The WLAN roaming threshold value may be set or selected using the selected data rate. For example, different WLAN roaming threshold values may correspond to the different data rates supported by the AP. A table that maps the selected data rate to a particular WLAN roaming threshold value may be generated or stored. As discussed above, the WLAN roaming threshold value may be in terms of a parameter of the wireless communication link with the WLAN AP 205, such as an RSSI value. Table 1 below illustrates one example with the WLAN roaming threshold value in terms of RSSI.

TABLE 1

| BT Device Type | WLAN Window | Calculated/ determined Data Rate | Selected Data Rate | Roaming Threshold |
| --- | --- | --- | --- | --- |
| A | 5 ms | 2.4 Mbps | 6 Mbps | −77 dBm |
| B | 2.5 ms | 4.8 Mbps | 11 Mbps | −75 dBm |
| C | 1.25 ms | 9.6 Mbps | 19.5 Mbps | −73 dBm |

As described above, the algorithm may involve setting the WLAN roaming threshold based at least in part on the type of BT device 220, the SCO/xSCO interval and the BT window, the WLAN window, the MPDU size, the calculated/determined data rate, or the selected data rate. A particular implementation may depend, for example, on what information may be known a priori or predetermined. The STA 215 may implement the algorithm to dynamically set the WLAN roaming threshold based at least in part on the type of BT device 220 the moment BT and WLAN coexist (e.g., concurrent active BT voice call and WiFi traffic). Thus, the algorithm may be triggered by such coexistence, with a default (e.g., conventional) roaming threshold or algorithm being employed otherwise (e.g., absence or disconnect of active BT communications link).

Figure 3A:
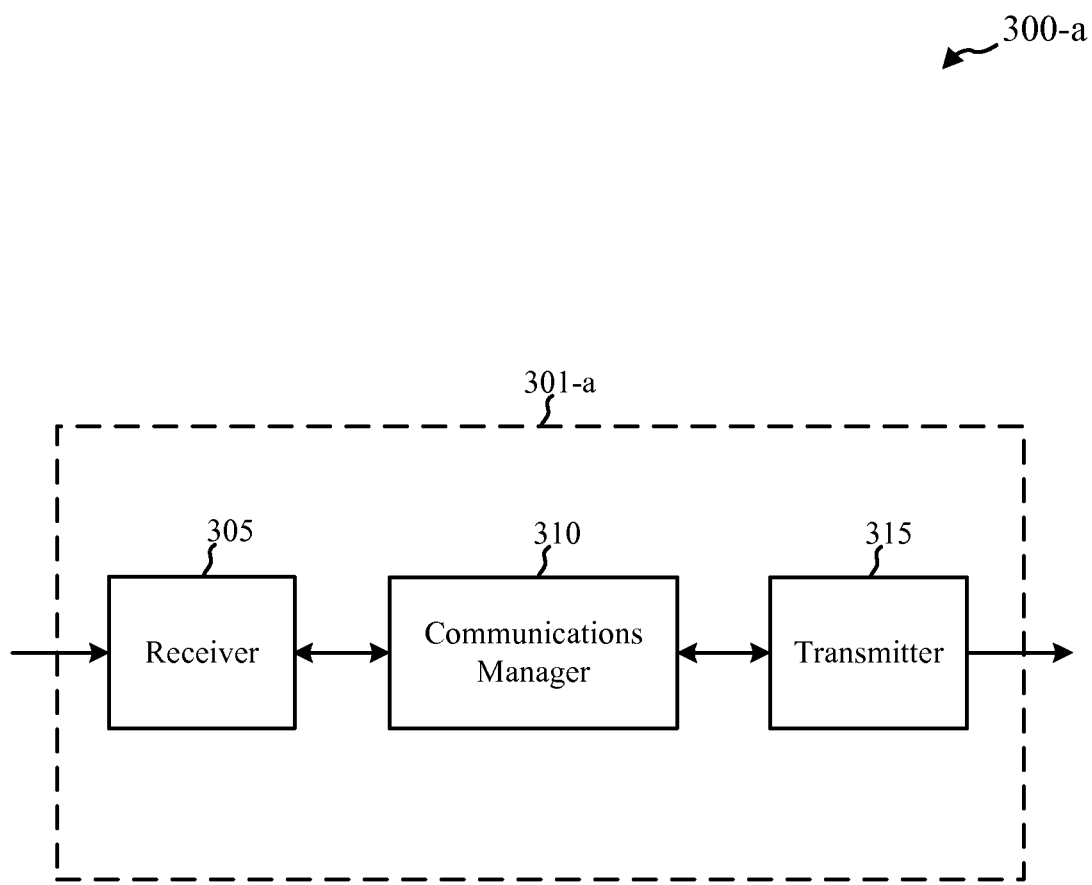
FIG. 3A shows a block diagram of an example of an apparatus that may be used for wireless communications, in accordance with various aspects of the present disclosure.

Turning now to FIG. 3A, a block diagram 300-a of an apparatus 301-a is shown that may be used for wireless communications, in accordance with various aspects of the present disclosure. The apparatus 301-a may be an example of various aspects of the STAs 115, 215 described with reference to FIG. 1 or 2A. The apparatus 301-a may also include or be implemented by a processor. The apparatus 301-a may include a receiver 305, a communications manager 310, and a transmitter 315. Each of these components may be in communication with each other.

The components of the apparatus 301-a (as well as those of other related apparatus described herein) may, individually or collectively, be implemented using application-specific integrated circuits (ASICs) adapted to perform some or all of the applicable functions in hardware. Alternatively, the functions may be performed by other processing units (or cores), on integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by general or application-specific processors (e.g., as illustrated in FIG. 4B).

Referring back to FIG. 3A, the receiver 305 may be or include a radio frequency (RF) receiver, such as an RF receiver operable to receive transmissions according to a particular radio access technology (RAT), such as WLAN. The receiver 305 also may be or include a radio frequency (RF) receiver, such as an RF receiver operable to receive transmissions according to a different RAT, such as BT. The receiver 305 may be used to receive various types of data or control signals (e.g., transmissions) over communication link(s) (e.g., physical channels) of a wireless communication system, such as communication links of the wireless communications system 100 described with reference to FIG. 1.

The transmitter 315 may be or include an RF transmitter, such as an RF transmitter operable to transmit according to the particular RAT, e.g., WLAN. The transmitter 315 also may be or include an RF transmitter, such as an RF transmitter operable to transmit according to the different RAT, e.g., BT. The transmitter 315 may be used to transmit various types of data or control signals (e.g., transmissions) over communication link(s) (e.g., physical channels) of a wireless communication system, such as communication links of the wireless communications system 100 described with reference to FIG. 1.

The communications manager 310 may be used to manage wireless communication according to the particular RAT, e.g., WLAN, and the different RAT, e.g., BT. For example, the communications manager 310 may be used to manage the transmitter 315 and the receiver 305. According to aspects of this disclosure, the communications manager 310 may be used to manage or otherwise control the receiver 305 and the transmitter 315 so that the wireless medium is shared between the particular RAT, e.g., WLAN, and the different RAT, e.g., BT, such as described above using TDM.

As discussed herein, in the case of coexisting WLAN and BT, the communications manager 310 may determine a type of BT device (not shown) being used. The communications manager 310 then may set or select a WLAN roaming threshold value based at least in part on the determined type of BT device, such as described herein. As such, the communications manager 310 also may be configured to determine a BT SCO window, an SCO interval, a WLAN window, an MPDU size, a threshold data rate, or the WLAN roaming threshold value. The communications manager 310 also may be configured to select a WLAN data rate from a plurality of data rates supported by a WLAN AP. Further, the communications manager 310 may be configured to implement a WLAN roaming procedure or otherwise perform a WLAN roaming operation using the set/selected WLAN roaming threshold value.

Figure 3B:
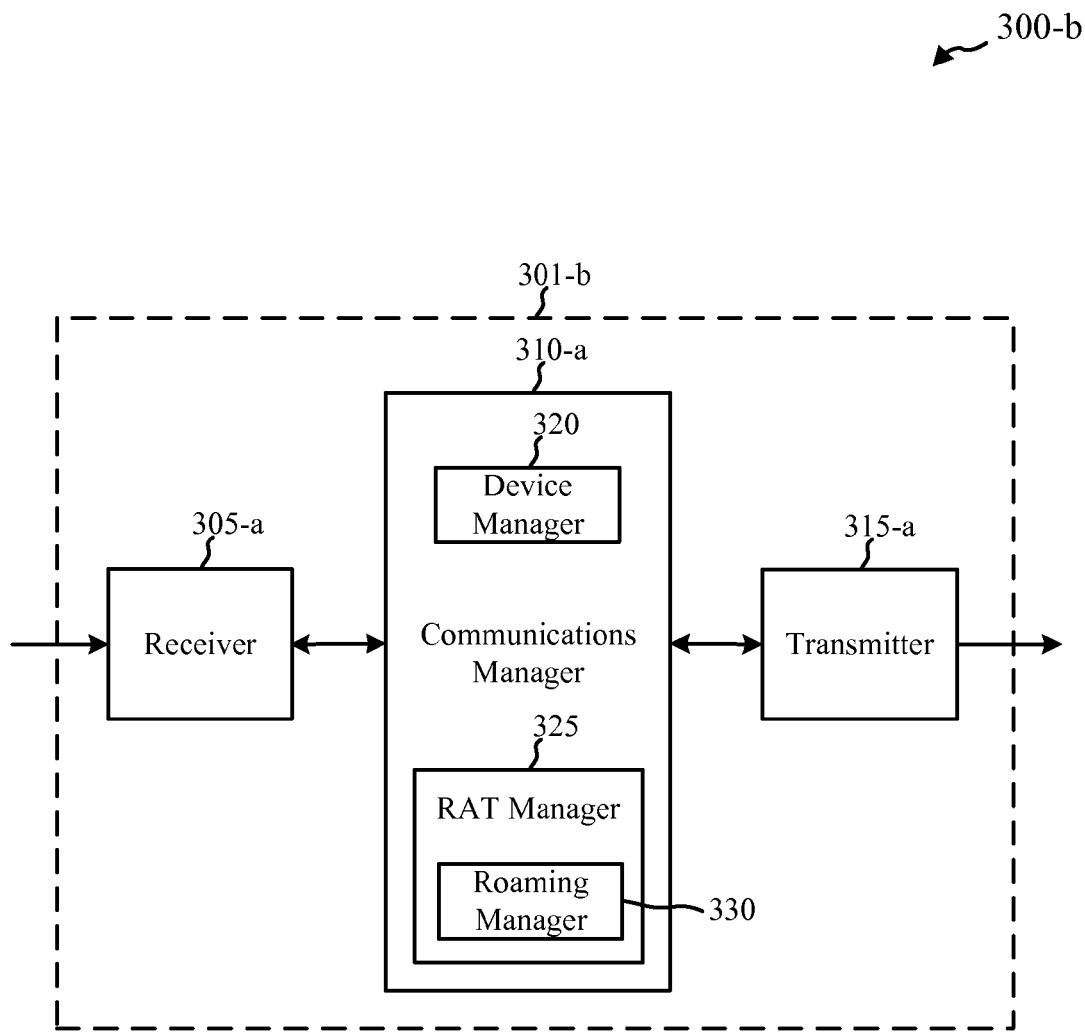
FIG. 3B shows a block diagram of another example of an apparatus that may be used for wireless communications, in accordance with various aspects of the present disclosure.

FIG. 3B shows a block diagram 300-b of an apparatus 301-b that may be used for wireless communications, in accordance with various aspects of the present disclosure. The apparatus 301-b may be an example of various aspects of the apparatus 301-a described above with reference to FIG. 3A or the STAs 115, 215 described with reference to FIG. 1 or 2A. The apparatus 301-b may also include or be implemented by a processor. The apparatus 301-b may include a receiver 305-a, a communications manager 310-a, and a transmitter 315-a. Each of these components may be in communication with each other.

The receiver 305-a and the transmitter 315-a may operate similarly to the receiver 305 and the transmitter 315, respectively, as described above with reference to FIG. 3A. The communications manager 310-a also may perform similar operations as the communications manager 310 described above with reference to FIG. 3A. Further, the communications manager 310-a may include a BT manager 320 and a WLAN manager 325.

The BT manager 320 may be configured to cooperate with the BT device (not shown) and may be configured to determine the type of the BT device. The BT manager 320 may be configured to determine the SCO interval and the BT window, either based at least in part on the type of the BT device or based at least in part on a communication of such information by the BT device. The BT manager 320 may be configured to determine a WLAN window using the SCO interval and the BT window (e.g., calculate), or may determine the WLAN window from the type of the BT device. The BT manager 320 may provide the WLAN window to the WLAN manager 325.

Either the communications manager 310-a or the WLAN manager 325 may be configured to determine an MPDU size for WLAN communications. As discussed above, the MPDU size may be a predetermined value (e.g., a maximum MPDU size) or may depend on the WLAN system and be communicated from a WLAN AP of the system. The WLAN manager 325 may be configured to use the MPDU size or the WLAN window to determine a threshold data rate. Using the threshold data rate, the WLAN manager 325 may select a suitable data rate from data rates supported by the WLAN AP.

In this example, the WLAN manager 325 may include a roaming manager 330. The WLAN manager 325 or the roaming manager 330 may be configured to set or select a WLAN roaming threshold value using the selected data rate. As discussed above, the WLAN roaming threshold value may be set or selected based directly on the type of the BT device, the WLAN window, or the threshold data rate. The roaming manager 330 may be configured to implement a roaming procedure using the set/selected WLAN roaming threshold value as a trigger.

Figure 3C:
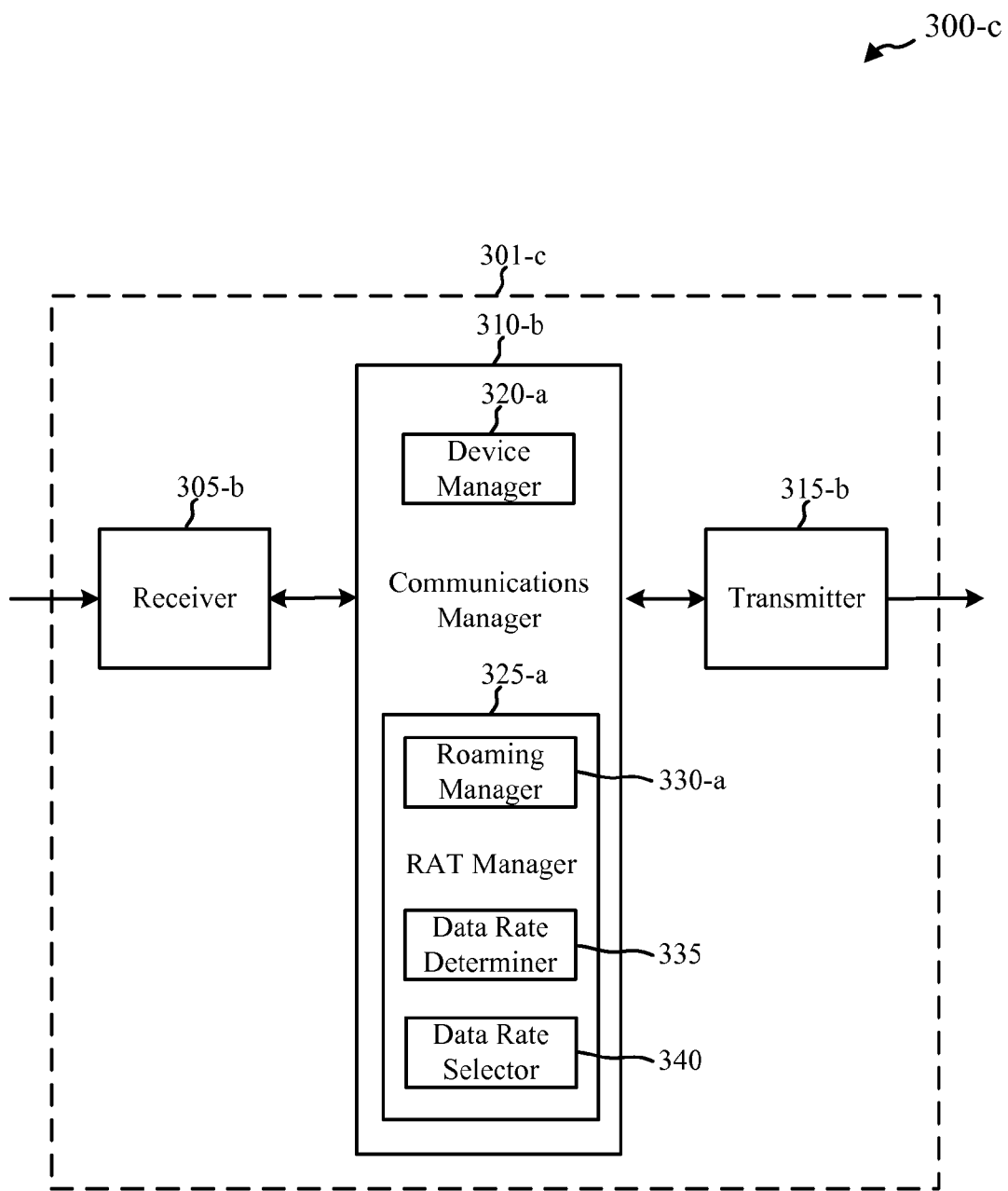
FIG. 3C shows a block diagram of yet another example of an apparatus that may be used for wireless communications, in accordance with various aspects of the present disclosure.

FIG. 3C shows a block diagram 300-c of an apparatus 301-c that may be used for wireless communications, in accordance with various aspects of the present disclosure. The apparatus 301-c may be an example of various aspects of the apparatus 301-a, 301-b described above with reference to FIG. 3A or 3B, or the STAs 115, 215 described with reference to FIG. 1 or 2A. The apparatus 301-c may also include or be implemented by a processor. The apparatus 301-c may include a receiver 305-b, a communications manager 310-b, and a transmitter 315-b. Each of these components may be in communication with each other.

The receiver 305-b and the transmitter 315-b may operate similarly to the receiver 305 and the transmitter 315, respectively, as described above with reference to FIG. 3A. The communications manager 310-b may perform similar operations as the communications manager 310, 310-a described above with reference to FIG. 3A or 3B. Further, the communications manager 310-b may include a BT manager 320-a and a WLAN manager 325-a, which may perform similar operations as the BT manager 320 and the WLAN manager 325, respectively, as described above with reference to FIG. 3B.

The WLAN manager 325-a may include a roaming manager 330-a, which may perform similar operations as the roaming manager 330 described above with reference to FIG. 3B. The WLAN manager 325-a also may include a data rate determiner 335 and a data rate selector 340, which may perform the operations of determining a threshold data rate and selecting a suitable data rate from data rates supported by the WLAN AP, respectively, as described above with reference to FIG. 3B.

Figure 3D:
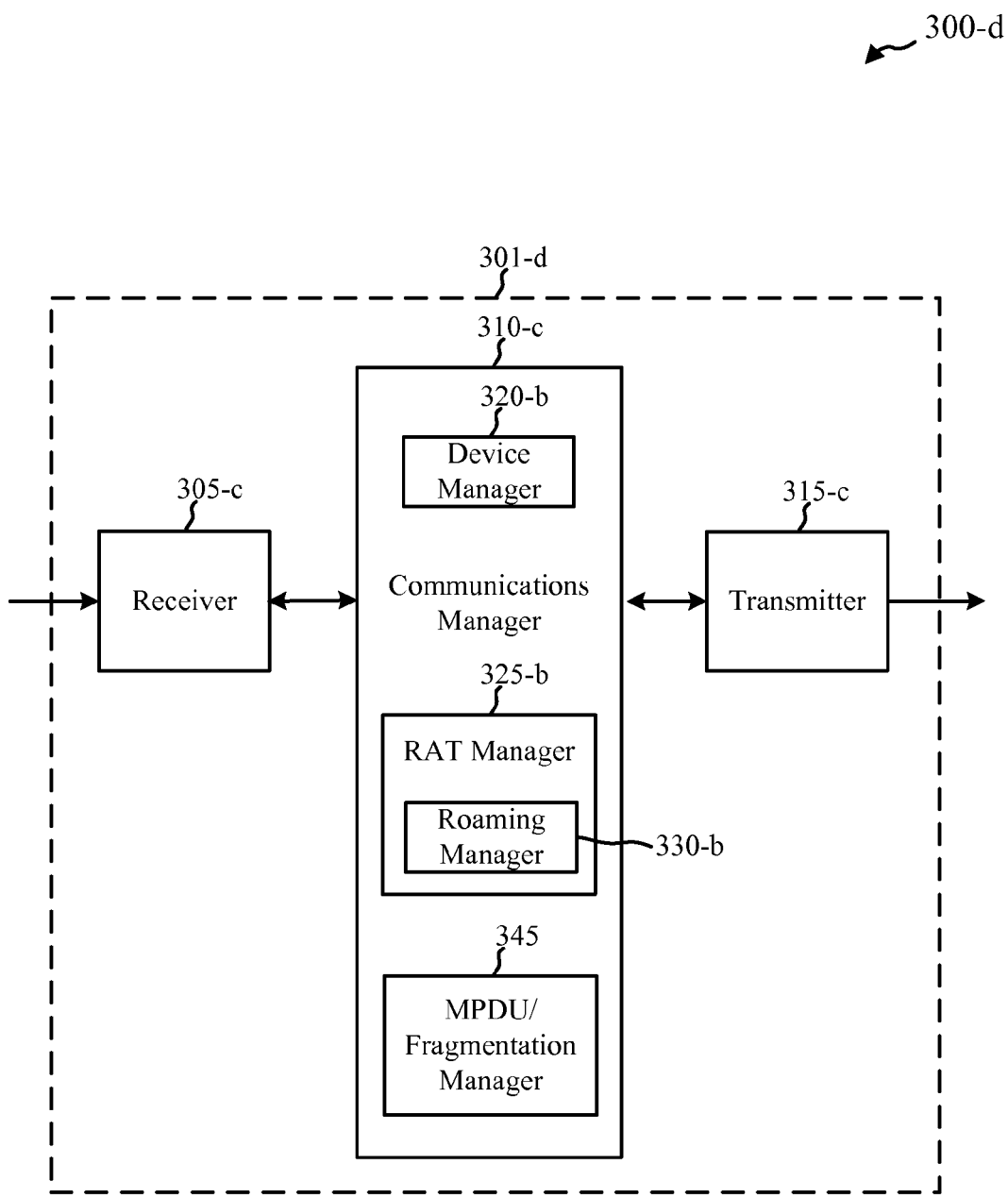
FIG. 3D shows a block diagram of still another example of an apparatus that may be used for wireless communications, in accordance with various aspects of the present disclosure.

FIG. 3D shows a block diagram 300-d of an apparatus 301-d that may be used for wireless communications, in accordance with various aspects of the present disclosure. The apparatus 301-d may be an example of various aspects of the apparatus 301-a, 301-b, 301-c described above with reference to FIG. 3A, 3B or 3C, or the STAs 115, 215 described with reference to FIG. 1 or 2A. The apparatus 301-d may also be a processor. The apparatus 301-d may include a receiver 305-c, a communications manager 310-c, and a transmitter 315-c. Each of these components may be in communication with each other.

The receiver 305-c and the transmitter 315-c may operate similarly to the receiver 305 and the transmitter 315, respectively, as described above with reference to FIG. 3A. The communications manager 310-c may perform similar operations as the communications manager 310, 310-a described above with reference to FIG. 3A or 3B. Further, the communications manager 310-b may include a BT manager 320-b and a WLAN manager 325-b, which may perform similar operations as the BT manager 320 and the WLAN manager 325, respectively, as described above with reference to FIG. 3B. The WLAN manager 325-b may include a roaming manager 330-b, which may perform similar operations as the roaming manager 330 described above with reference to FIG. 3B.

The communications manager 310-c also may include an MPDU/fragmentation manager 345. In addition or alternatively to performing operations to determine an MPDU size for WLAN communications as described above with respect to FIG. 3B, the MPDU/fragmentation manager 345 may be configured to determine a size of a fragment of an MPDU. The MPDU/fragmentation manager 345 may set the size of the fragment based at least in part on a current WLAN data rate. Thus, in a case where performance of the wireless communication link with the WLAN AP has degraded such that a full MPDU may not be transmitted/received within the WLAN window, the MPDU may be fragmented so that at least part of the MPDU may be successfully transmitted/received within the WLAN window. Such fragmentation may be employed, for example, when the WLAN system is sufficiently congested or when sufficient interference exists.

The MPDU/fragmentation manager 345 may provide the fragment size (instead of the MPDU size) to the WLAN manager 325-*b*, for example, to determine a threshold data rate. Using the threshold data rate, the WLAN manager 325-*b* may select a suitable data rate from data rates supported by the WLAN AP, and may set or select a WLAN roaming threshold value using the selected data rate.

Figure 4A:
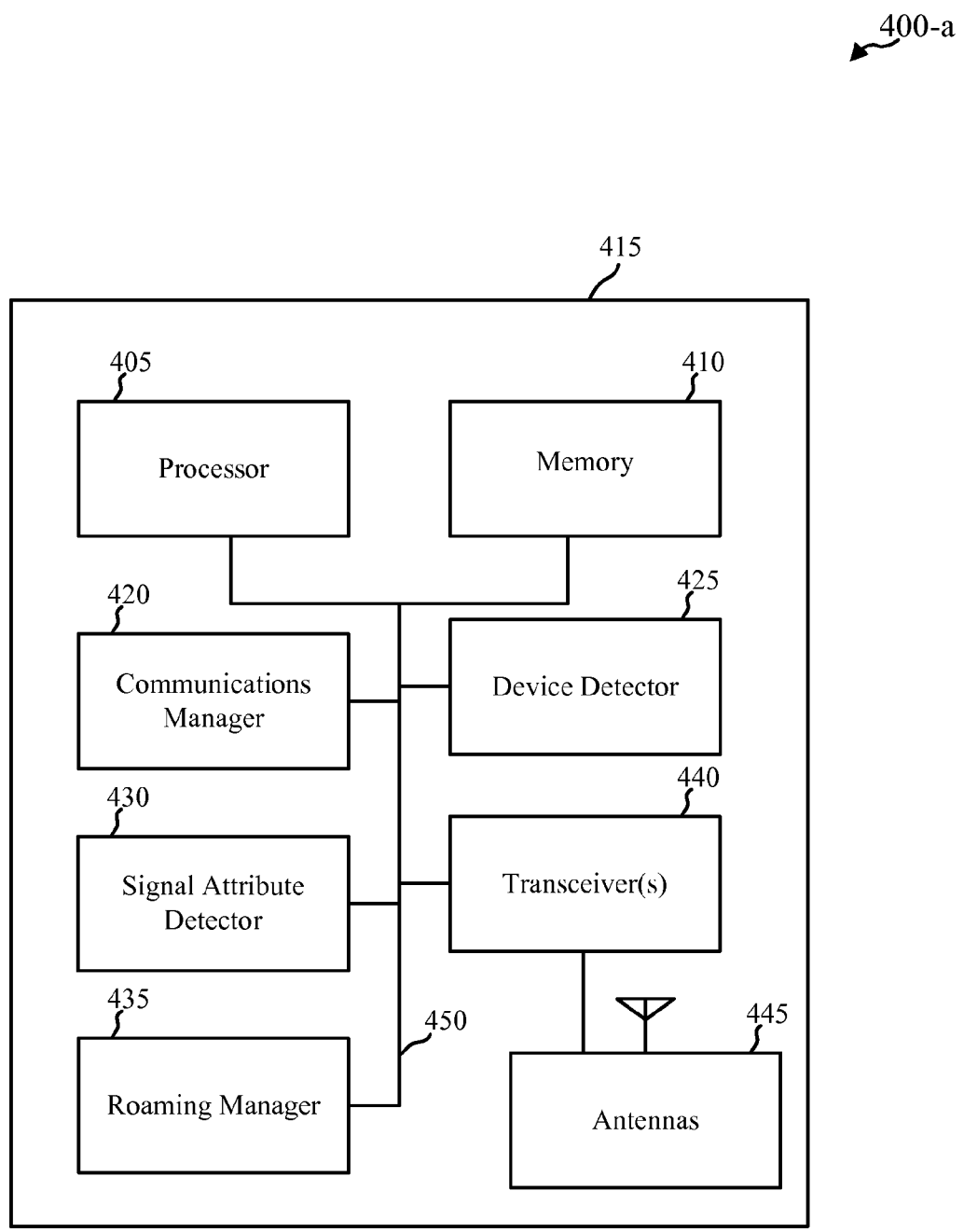
FIG. 4A shows a block diagram illustrating an example of an architecture for a station (STA) for wireless communications, in accordance with various aspects of the present disclosure.
Figure 4B:
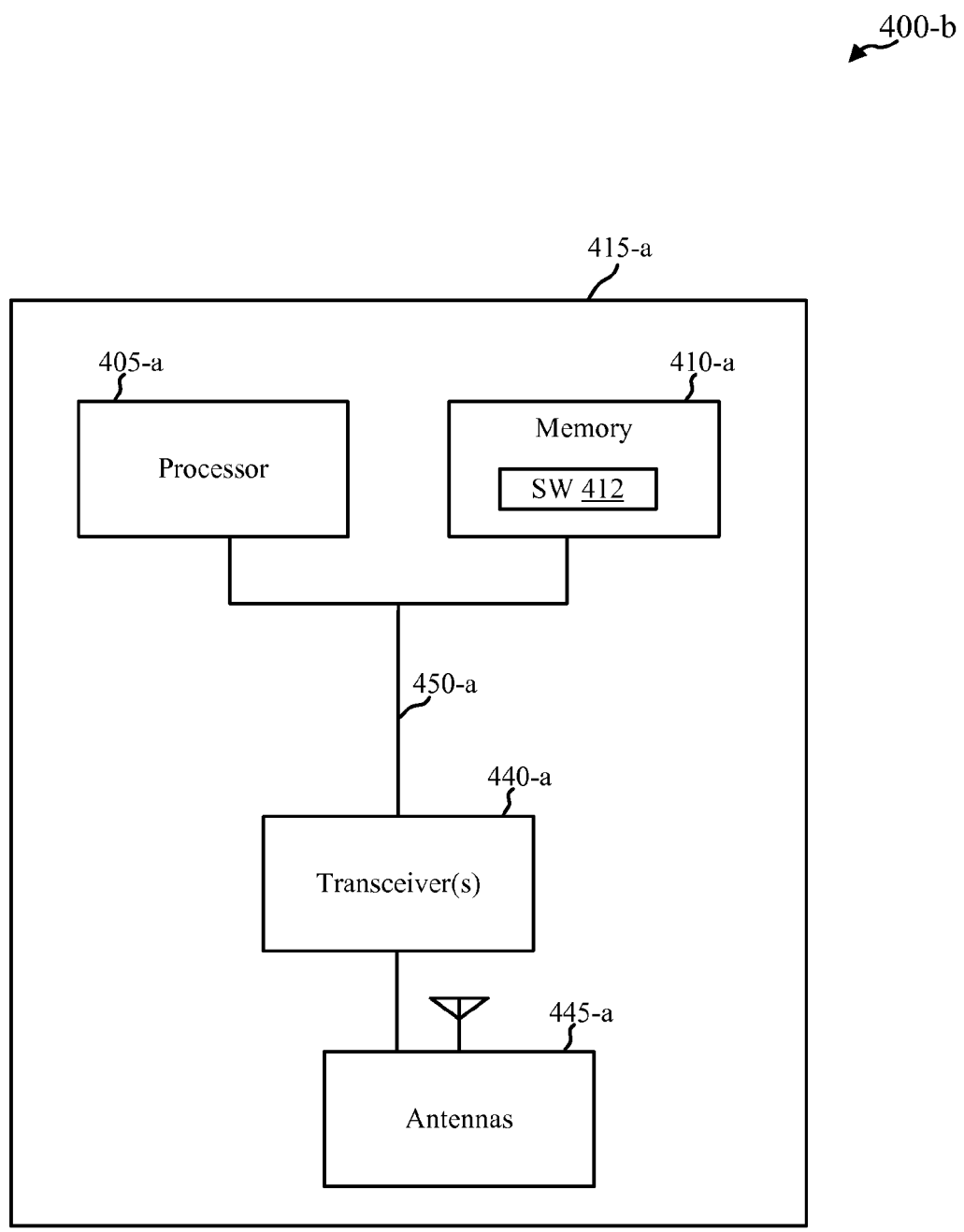
FIG. 4B shows a block diagram illustrating another example of an architecture for a station (STA) for wireless communications, in accordance with various aspects of the present disclosure.

FIG. 4A shows a block diagram 400 illustrating an example of an architecture for a STA 415 for wireless communications, in accordance with various aspects of the present disclosure. The STA 415 may have various configurations and may be included or be part of a personal computer (e.g., a laptop computer, netbook computer, tablet computer, etc.), a cellular telephone (e.g., a smartphone), a PDA, a digital video recorder (DVR), an internet appliance, a gaming console, an e-reader, etc. The STA 415 may in some cases have an internal power supply (not shown), such as a small battery, to facilitate mobile operation. The STA 415 may be an example of various aspects of the apparatus 301-*a*, 301-*b*, 301-*c*, 301-*d* described with reference to FIGS. 3A, 3B, 3C and 3D, or the STAs 115, 215 described with reference to FIG. 1 or 2A. The STA 415 may implement at least some of the features and functions described with reference to FIGS. 1, 2A, 2B, 3A, 3B, 3C and 3D. The STA 415 may communicate with access points 105 described with reference to FIG. 1.

The STA 415 may include a processor 405, a memory 410, a communications manager 420, a BT device detector 425, a signal attribute detector 430, a roaming manager 435, a transceiver 440, and an antenna 445. Each of these components may be in communication with each other, directly or indirectly, over a bus 450.

The memory 410 may include random access memory (RAM) or read-only memory (ROM). The processor 405 may include an intelligent hardware device, e.g., a CPU, a microcontroller, an ASIC, etc. The processor 405 may process information received through the transceiver(s) 440 or information to be sent to the transceiver(s) 440 for transmission through the antenna(s) 445. Such information may be stored in the memory 410 and accessed by the processor 405 (as well as other components, as appropriate or desired). The processor 405 may handle, alone or in connection with the communications manager 420, the BT device detector 425, the signal attribute detector 430, and the roaming manager 435, various aspects of communicating over the RATs.

The transceiver(s) 440 may include a modem to modulate packets and provide the modulated packets to the antenna(s) 445 for transmission, and to demodulate packets received from the antenna(s) 445. The transceiver(s) 440 may in some cases be implemented as separate transmitters and receivers. The transceiver(s) 440 may support communications according to the RATs. The transceiver(s) 440 may communicate bi-directionally, via the antenna(s) 445, with the access point(s) 105, 205 described with reference to FIG. 1 or 2A. While the STA 415 may include a single antenna 445, there may be implementations in which the STA 415 may include multiple antennas 445.

The communications manager 420 may perform and control some or all of the features and functions described with reference to FIGS. 1, 2A, 2B, 3A, 3B, 3C and 3D related to wireless communication with coexisting RATs and roaming. For example, communications manager 420 may implement a WLAN roaming scheme that takes into account the type of BT device being used. The communications manager 420 may be an example of various aspects of the communications manager 310, 310-*a*, 310-*b* or 310-*c* described with reference to FIG. 3A, 3B, 3C or 3D. The communications manager 420, or portions of it, may include a processor, and some or all of the functionality of the communications manager 420 may be performed by the processor 405 or in connection with the processor 405.

The BT device detector 425 may be configured to determine the type of the BT device (not shown) being used with the STA 415. Alternatively or additionally, the BT device detector 425 may be configured to determine information regarding the BT device, such as the BT window and the SCO interval.

The signal attribute detector 430 may be configured to monitor signals from WLAN APs to determine a parameter of the current WLAN AP for triggering WLAN roaming and to determine whether a candidate AP satisfies a criterion for transfer of the WLAN wireless communication link of the STA 415 to the candidate AP. In some examples, the parameter may be the RSSI of the current WLAN AP and the criterion may be a certain increase in RSSI over the RSSI of the current WLAN AP.

The roaming manager 435 may be configured to set or select a WLAN roaming threshold value as described herein. The roaming manager 435 may implement a suitable WLAN roaming procedure in conjunction with other components of the STA 415.

FIG. 4B shows a block diagram 400-*a* illustrating an example of an architecture for a STA 415-*a* for wireless communications, in accordance with various aspects of the present disclosure. The STA 415-*a* may have various configurations and may be included or be part of a personal computer (e.g., a laptop computer, netbook computer, tablet computer, etc.), a cellular telephone (e.g., a smartphone), a PDA, a digital video recorder (DVR), an internet appliance, a gaming console, an e-reader, etc. The STA 415-*a* may in some cases have an internal power supply (not shown), such as a small battery, to facilitate mobile operation. The STA 415-*a* may be an example of various aspects of the apparatus 301-*a*, 301-*b*, 301-*c*, 301-*d* described with reference to FIGS. 3A, 3B, 3C and 3D, or the STAs 115, 215, 415 described with reference to FIGS. 1, 2A and 4A. The STA 415-*a* may implement at least some of the features and functions described with reference to FIGS. 1, 2A, 2B, 3A, 3B, 3C, 3D and 4A. The STA 415-*a* may communicate with access points 105 described with reference to FIG. 1.

The STA 415-*a* may include a processor 405-*a*, a memory 410-*a*, a transceiver 440-*a*, and an antenna 445-*a*. Each of these components may be in communication with each other, directly or indirectly, over a bus 450-*a*. The transceiver(s) 440-*a* and the antenna(s) 445-*a* may be configured similarly to the transceiver(s) 440 and the antenna(s) 445, respectively, described above with respect to FIG. 4A.

The memory 410-*a* may include RAM and read-only memory ROM. The processor 405-*a* may include an intelligent hardware device, e.g., a CPU, a microcontroller, an ASIC, etc. The processor 405-*a* may process information received through the transceiver(s) 440-*a* and information to be sent to the transceiver(s) 440-*a* for transmission through the antenna(s) 445-*a*. Such information may be stored in the memory 410-*a* and accessed by the processor 405-*a*. The processor 405-*a* may handle various aspects of communicating over the RATs.

The memory 410-*a* may store computer-readable, computer executable software (SW) code 412 containing instructions that, when executed, cause the processor 405-*a* to perform various functions described herein for communicating via coexisting RATs. Alternatively, the software code 412 may not be directly executable by the processor 405-*a* but may cause the STA 415-*a* (e.g., when compiled and executed) to perform various functions described herein.

Figure 5:
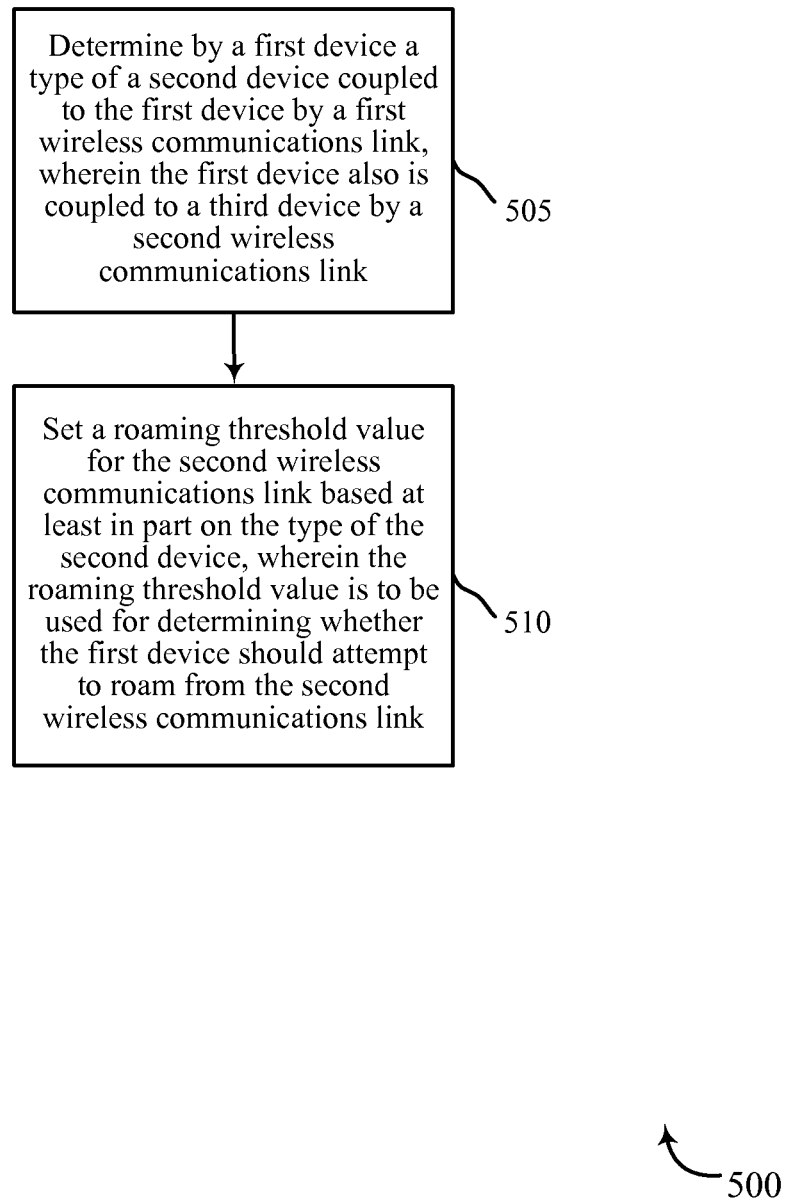
FIG. 5 is a flowchart illustrating an example of a method for wireless communication, in accordance with various aspects of the present disclosure.

FIG. 5 is a flowchart illustrating an example of a method 500 for wireless communication, in accordance with various aspects of the present disclosure. The method 500 described below may be performed in accordance with aspects of the STAs 115, 215, 415, 415-*a* described with reference to FIG. 1, 2A, 4A, or 4B, or the apparatus 301-*a*, 301-*b*, 301-*c*, 301-*d* described with reference to FIG. 3A, 3B, 3C, or 3D. Such a STA or apparatus may execute sets of codes to control the functional elements of the STA or apparatus to perform the functions described below.

At block 505, the method may involve determining by a first device a type of a second device coupled to the first device by a first wireless communications link, wherein the first device also is coupled to a third device by a second wireless communications link. At block 510, a roaming threshold value for the second wireless communication link may be set based at least in part on the type of the second device. The roaming threshold value may be used for determining whether the first device should attempt to roam from the second wireless communications link. In such a manner, coexistence of multiple RATs may be taken into account for roaming.

Figure 6:
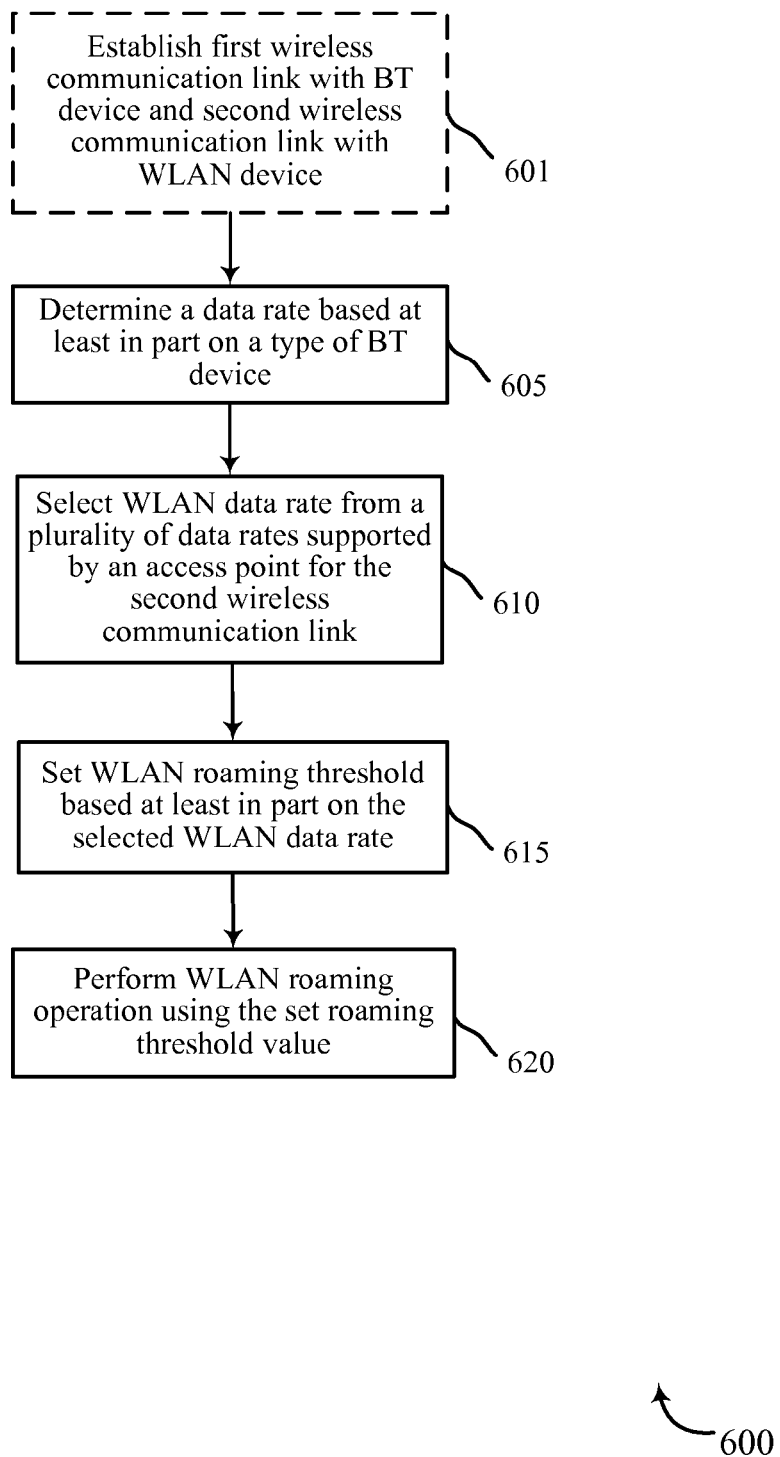
FIG. 6 is a flowchart illustrating another example of a method for wireless communication, in accordance with various aspects of the present disclosure.

FIG. 6 is a flowchart illustrating another example of a method 600 for wireless communication, in accordance with various aspects of the present disclosure. As with the method 500 described above, the method 600 may be performed in accordance with aspects of the STAs 115, 215, 415, 415-*a* described with reference to FIG. 1, 2A, 4A, or 4B, or the apparatus 301-*a*, 301-*b*, 301-*c*, 301-*d* described with reference to FIG. 3A, 3B, 3C, or 3D. For the sake of clarity, the method 600 is described with respect to a WLAN device and a BT device (e.g., devices configured or otherwise capable of communicating using WLAN and BT, respectively, with the WLAN device being capable of operating concurrently over multiple RATs). However, it should be understood that the method 600 may be implemented with other devices operating over different RATs than described.

Optionally, at block 601, the method 600 may involve establishing a first wireless communication link with a BT device and establishing a second wireless communication link with a WLAN device, in either order.

At block 605, a data rate may be determined based at least in part on a type of BT device being used. As described above, the data rate may be directly based at least in part on the BT device type, or may be determined using information regarding the BT device type (e.g., SCO interval and BT window).

At block 610, a WLAN data rate may be selected from a plurality of data rates supported by an access point for the second wireless communication link. As described above, the WLAN data rate may be selected based at least in part on the data rate determined at block 605. Then, at block 615, a WLAN roaming threshold value may be set based at least in part on the WLAN data rate selected at block 610. Once the WLAN roaming threshold value is set, a WLAN roaming operation may be performed using the roaming threshold value as a trigger for roaming at block 620. In such a manner, WLAN roaming may be performed while mitigating potential adverse impacts from the coexisting BT. Although not shown, it should be understood that the method 600 may be adaptive, for example, by further readjusting the roaming threshold and repeating the roaming operation if the roaming operation is not successful.

Figure 7:
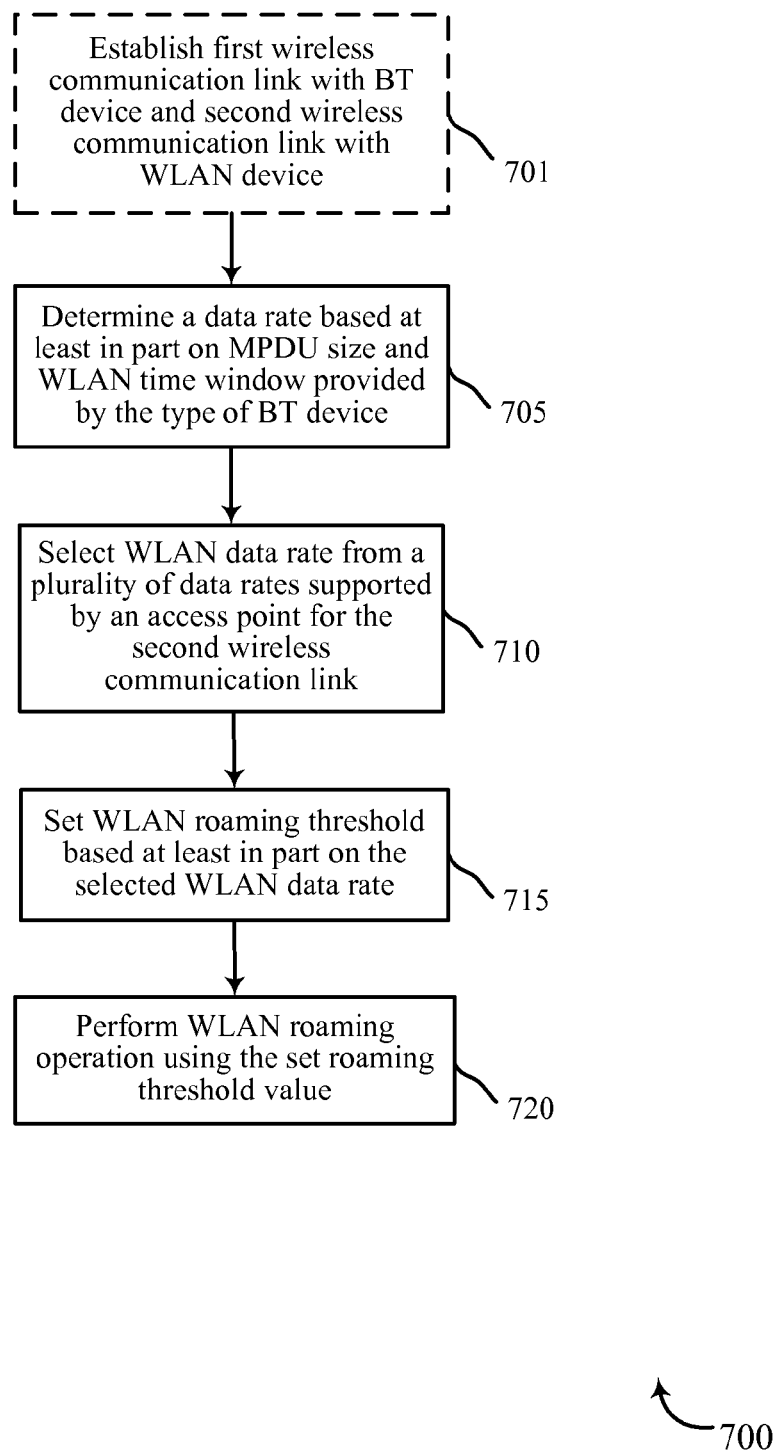
FIG. 7 is a flowchart illustrating yet another example of a method for wireless communication, in accordance with various aspects of the present disclosure.

FIG. 7 is a flowchart illustrating yet another example of a method 700 for wireless communication, in accordance with various aspects of the present disclosure. As with the methods 500 and 600 described above, the method 700 may be performed in accordance with aspects of the STAs 115, 215, 415, 415-*a* described with reference to FIG. 1, 2A, 4A, or 4B, or the apparatus 301-*a*, 301-*b*, 301-*c*, 301-*d* described with reference to FIG. 3A, 3B, 3C, or 3D. For the sake of clarity, the method 700 is described with respect to a WLAN device and a BT device (e.g., devices configured or otherwise capable of communicating using WLAN and BT, respectively, with the WLAN device being capable of operating concurrently over multiple RATs). However, it should be understood that the method 700 may be implemented with other devices operating over different RATs than described.

Optionally, at block 701, the method 700 may involve establishing a first wireless communication link with a BT device and establishing a second wireless communication link with a WLAN device, in either order.

At block 705, a data rate may be determined based at least in part on an MPDU size and WLAN time window provided by the type of BT device. As described above, the data rate may be a threshold data rate for transmission/reception of one MPDU within the WLAN time window.

At block 710, a WLAN data rate may be selected from a plurality of data rates supported by an access point for the second wireless communication link. As described above, the WLAN data rate may be selected based at least in part on the threshold data rate determined at block 705. Then, at block 715, a WLAN roaming threshold value may be set based at least in part on the WLAN data rate selected at block 710. Once the WLAN roaming threshold value is set, a WLAN roaming operation may be performed using the roaming threshold value as a trigger for roaming at block 720. In such a manner, WLAN roaming may be performed in accordance with the MPDU size while mitigating potential adverse impacts from the coexisting BT. Although not shown, it should be understood that the method 700 may be adaptive, for example, by further readjusting the roaming threshold and repeating the roaming operation if the roaming operation is not successful.

Figure 8:
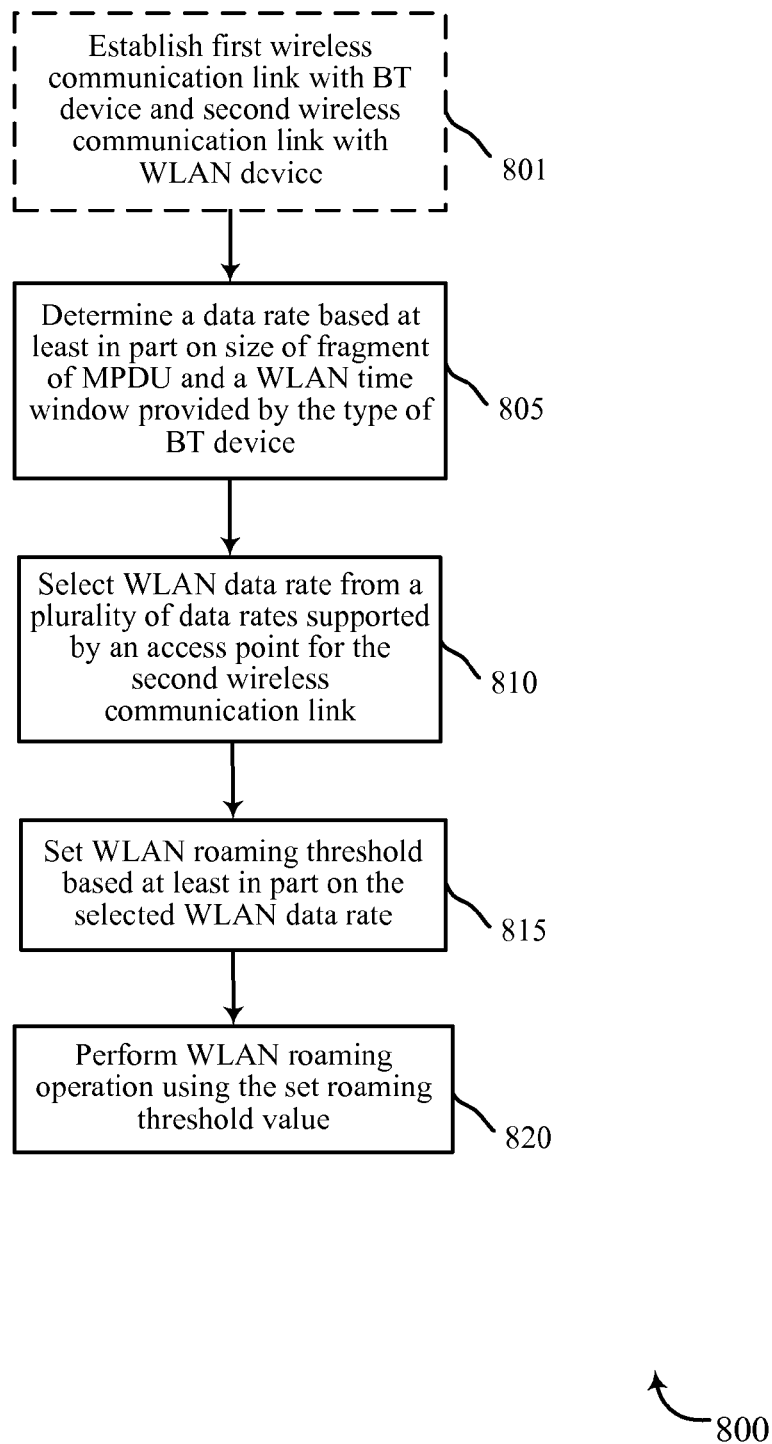
FIG. 8 is a flowchart illustrating still another example of a method for wireless communication, in accordance with various aspects of the present disclosure; and, FIG. 9 is a flowchart illustrating a further example of a method for wireless communication, in accordance with various aspects of the present disclosure.

FIG. 8 is a flowchart illustrating still another example of a method 800 for wireless communication, in accordance with various aspects of the present disclosure. As with the methods 500, 600 and 700 described above, the method 800 may be performed in accordance with aspects of the STAs 115, 215, 415, 415-*a* described with reference to FIG. 1, 2A, or 4, or the apparatus 301-*a*, 301-*b*, 301-*c*, 301-*d* described with reference to FIG. 3A, 3B, 3C, or 3D. For the sake of clarity, the method 800 is described with respect to a WLAN device and a BT device (e.g., devices configured or otherwise capable of communicating using WLAN and BT, respectively, with the WLAN device being capable of operating concurrently over multiple RATs). However, it should be understood that the method 800 may be implemented with other devices operating over different RATs than described.

Optionally, at block 801, the method 800 may involve establishing a first wireless communication link with a BT device and establishing a second wireless communication link with a WLAN device, in either order.

At block 805, a data rate may be determined based at least in part on an MPDU fragment size and WLAN time window provided by the type of BT device. As described above, the data rate may be a threshold data rate for transmission/reception of one MPDU fragment within the WLAN time window.

At block 810, a WLAN data rate may be selected from a plurality of data rates supported by an access point for the second wireless communication link. As described above, the WLAN data rate may be selected based at least in part on the threshold data rate determined at block 805. Then, at block 815, a WLAN roaming threshold value may be set based at least in part on the WLAN data rate selected at block 815. Once the WLAN roaming threshold value is set, a WLAN roaming operation may be performed using the roaming threshold value as a trigger for roaming at block 820. In such a manner, WLAN roaming may be performed in accordance with the MPDU fragment size while mitigating potential adverse impacts from the coexisting BT. Although not shown, it should be understood that the method 800 may be adaptive, for example, by further readjusting the roaming threshold and repeating the roaming operation if the roaming operation is not successful.

Figure 9:
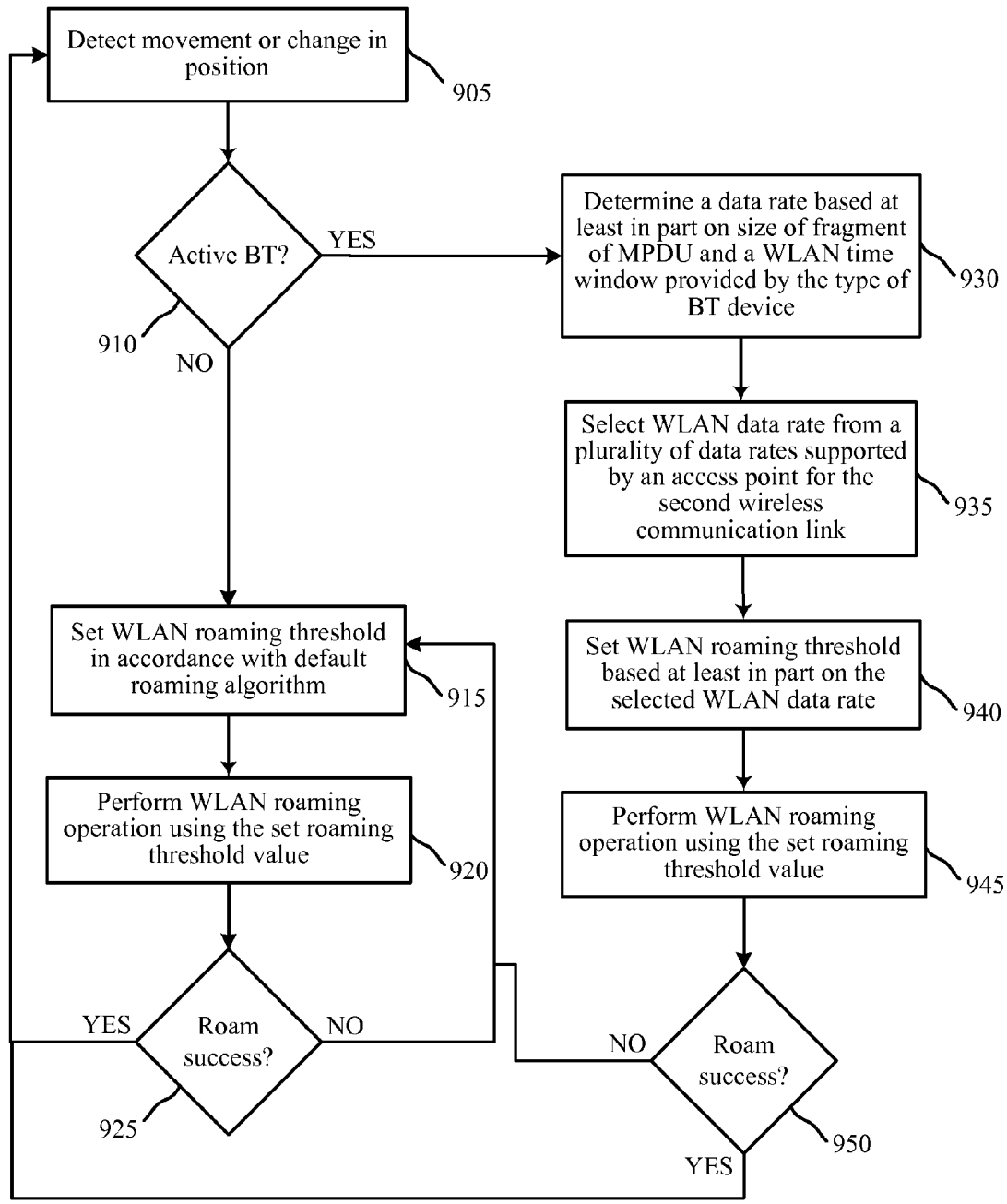

FIG. 9 is a flowchart illustrating a further example of a method 900 for wireless communication, in accordance with various aspects of the present disclosure. As with the methods 500, 600, 700 and 800 described above, the method 900 may be performed in accordance with aspects of the STAs 115, 215, 415, 415-*a* described with reference to FIG. 1, 2A, 4A, or 4B, or the apparatus 301-*a*, 301-*b*, 301-*c*, 301-*d* described with reference to FIG. 3A, 3B, 3C, or 3D. For the sake of clarity, the method 900 is described with respect to a WLAN device and a BT device (e.g., devices configured or otherwise capable of communicating using WLAN and BT, respectively, with the WLAN device being capable of operating concurrently over multiple RATs). However, it should be understood that the method 900 may be implemented with other devices operating over different RATs than described.

For implementation of the method 900, the WLAN device or STA may be coupled to a WLAN network via a WLAN communications link. At block 905, the method may involve detecting or otherwise determining movement or a change in position of a STA. This may be accomplished using any known or hereafter developed technology (e.g., accelerometers, a Global Positioning System (GPS), triangulation, etc.).

At block 910, the method may involve determining whether the STA has an active BT communications link, concurrent with the WLAN communications link (e.g., concurrent WLAN download and BT voice call). If not, the method may continue to block 915, where a WLAN roaming threshold may be set in accordance with a default roaming algorithm (e.g., an existing WLAN roaming algorithm). Then, at block 920, a WLAN roaming operation may be performed using the set roaming threshold value.

At block 925, whether the WLAN roaming operation with the set roaming threshold value resulted in a successful roam. If not (if no candidate WLAN AP is found to meet the criterion (e.g., X dB above the RSSI of the current WLAN AP)), the method may return to block 915 to set a different WLAN roaming threshold (e.g., adjust the previous threshold) and then retry the WLAN roaming operation using the different WLAN roaming threshold. This may be repeated until roaming is successful, for a preset number of retries, or until a threshold or maximum adjustment in the WLAN roaming threshold has been reached. If the WLAN roaming procedure results in a successful roam, the method may return to block 905 to detect further movement or change in position that may occur.

If an active BT communications link is determined to exist concurrently with the WLAN communications link at block 910, the method may jump to block 930 to implement a modified approach for WLAN roaming. At block 930, a data rate may be determined based at least in part on an MPDU fragment size and WLAN time window provided by the type of BT device. As described above, the data rate may be a threshold data rate for transmission/reception of one MPDU fragment within the WLAN time window.

At block 935, a WLAN data rate may be selected from a plurality of data rates supported by an access point for the second wireless communication link. As described above, the WLAN data rate may be selected based at least in part on the threshold data rate determined at block 930. Then, at block 940, a WLAN roaming threshold value may be set based at least in part on the WLAN data rate selected at block 935. Once the WLAN roaming threshold value is set, a WLAN roaming operation may be performed using the roaming threshold value as a trigger for roaming at block 945.

At block 950, whether the WLAN roaming operation at block 945 with the set roaming threshold value resulted in a successful roam. If not, the method may return to block 915 to implement the default roaming algorithm. If the WLAN roaming operation at block 945 results in a successful roam, then the method may return to block 905 to detect further movement or change in position that may occur. Although not shown, it should be understood that the modified WLAN roaming algorithm of method 900 also may be adaptive, such as described with respect to the default roaming algorithm of method 900. For example, upon determining an unsuccessful roam at block 950, the method may return to block 940 to reset (e.g., adjust) the WLAN roaming threshold, and continue to block 945 for repeating the roaming operation with the reset/adjusted WLAN roaming threshold. In such a manner, WLAN roaming may be performed in accordance with the MPDU fragment size while mitigating potential adverse impacts from the coexisting BT.

The detailed description set forth above in connection with the appended drawings describes examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components (or modules) described in connection with the disclosure herein, such as the communications manager 310, 310-*a*, 420, the RAT manager 325, 325-*a*, 325-*b*, the roaming manager 330, 330-*a*, 330-*b*, 435, the device manager 320, 320-*a*, 320-*b*, the data rate determiner 335, the data rate selector 340, the MPDU/fragmentation manager 345, the device detector 425, and the signal attribute detector 430, may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein, but is to be accorded the widest scope consistent with the principles and novel features disclosed herein.

What is claimed is:

1. A method for coordinating wireless communications from multiple concurrent communication links, comprising:
    determining by a first device a type of a second device coupled to the first device by a first wireless communications link, wherein the first device also is coupled to a third device by a second wireless communications link;
    determining a data rate of the second device based at least in part on the type of the second device; and
    setting a roaming threshold value for the second wireless communications link based at least in part on the data rate of the type of the second device, wherein the roaming threshold value is to be used for determining whether the first device should attempt to roam from the second wireless communications link.

2. The method of claim 1, wherein:
    the second device is a Bluetooth (BT) device;
    the second wireless communication link is part of a wireless local area network (WLAN); and
    the roaming threshold value is a WLAN roaming threshold value.

3. The method of claim 2, wherein the WLAN roaming threshold value is set for the second wireless communications link without regard to the type of BT device upon disconnect of the first wireless communications link.

4. The method of claim 2, further comprising:
    performing a WLAN roaming operation using the WLAN roaming threshold value, wherein the WLAN roaming threshold value is a received signal strength indicator (RSSI) value.

5. The method of claim 2, further comprising:
    determining a data rate based at least in part on the type of BT device;
    wherein the WLAN roaming threshold value is based at least in part on the determined data rate.

6. The method of claim 5, wherein determining the data rate is based at least in part on a synchronous connection oriented (SCO) window and SCO interval provided by the type of BT device.

7. The method of claim 5, further comprising:
    selecting a WLAN data rate from a plurality of data rates supported by an access point for the second wireless communications link based at least in part on the determined data rate.

8. The method of claim 7, wherein the WLAN roaming threshold value is based at least in part on the selected WLAN data rate.

9. The method of claim 5, wherein determining the data rate is based at least in part on a WLAN time window provided by the type of BT device and at least in part on a parameter from the group consisting of: a medium access control (MAC) packet data unit (MPDU) size and a size of a fragment of a medium access control (MAC) packet data unit (MPDU).

10. The method of claim 9, wherein determining the data rate comprises:
    determining a threshold data rate to transfer the MPDU over the second wireless communications link during the WLAN time window.

11. The method of claim 9, wherein determining the data rate comprises:

determining a threshold data rate to transfer the fragment over the second wireless communications link during the WLAN time window.

12. The method of claim 11, further comprising:
setting the size of the fragment based at least in part on a current WLAN data rate for the second wireless communications link.

13. An apparatus for wireless communication, comprising:
means for determining by a first device a type of a second device coupled to the first device by a first wireless communications link, wherein the first device also is coupled to a third device by a second wireless communications link;
means for determining a data rate of the second device based at least in part on the type of the second device; and
means for setting a roaming threshold value for the second wireless communications link based at least in part on the data rate of the type of the second device, wherein the roaming threshold value is to be used for determining whether the first device should attempt to roam from the second wireless communications link.

14. The apparatus of claim 13, wherein:
the second device is a Bluetooth (BT) device;
the second wireless communication link is part of a wireless local area network (WLAN); and
the roaming threshold value is a WLAN roaming threshold value.

15. The apparatus of claim 14, further comprising:
means for determining a data rate based at least in part on the type of BT device;
wherein the means for setting is configured to set the WLAN roaming threshold value based at least in part on the determined data rate.

16. The apparatus of claim 15, wherein the means for determining the data rate is configured to determine the data rate based at least in part on a synchronous connection oriented (SCO) window and SCO interval provided by the type of BT device.

17. The apparatus of claim 15, wherein the means for determining the data rate is configured to determine the data rate based at least in part on a WLAN time window provided by the type of BT device and at least in part on a parameter from the group consisting of: a medium access control (MAC) packet data unit (MPDU) size and a size of a fragment of a medium access control (MAC) packet data unit.

18. The apparatus of claim 15, further comprising:
means for selecting a WLAN data rate from a plurality of data rates supported by an access point for the second wireless communications link based at least in part on the determined data rate.

19. The apparatus of claim 18, wherein the means for setting is configured to set the WLAN roaming threshold value based at least in part on the selected WLAN data rate.

20. An apparatus for wireless communication, comprising:
a communications manager to determine a type of a second device coupled to the apparatus by a first wireless communications link, wherein the apparatus also is coupled to a third device by a second wireless communications link;
a data rate determiner to determine a data rate of the second device based at least in part on the type of the second device; and a roaming manager to set a roaming threshold value for the second wireless communications link based at least in part on the data rate of the type of the second device, wherein the roaming threshold value is to be used for determining whether the apparatus should attempt to roam from the second wireless communications link.

21. The apparatus of claim 20, wherein:
the second device is a Bluetooth (BT) device;
the second wireless communication link is part of a wireless local area network (WLAN); and
the roaming threshold value is a WLAN roaming threshold value.

22. The apparatus of claim 21, wherein:
the roaming manager also is to set the WLAN roaming threshold value for the second wireless communications link without regard to the type of BT device upon disconnect of the first wireless communications link.

23. The apparatus of claim 21, further comprising:
the data rate determiner to determine a data rate based at least in part on the type of BT device;
wherein the roaming manager is to set the WLAN roaming threshold value based at least in part on the determined data rate.

24. The apparatus of claim 23, wherein the data rate determiner is to determine the data rate based at least in part on a synchronous connection oriented (SCO) window and SCO interval provided by the type of BT device.

25. The apparatus of claim 23, further comprising:
a data rate selector to select a WLAN data rate from a plurality of data rates supported by an access point for the second wireless communications link based at least in part on the determined data rate.

26. The apparatus of claim 25, wherein the roaming manager is to set the WLAN roaming threshold value based at least in part on the selected WLAN data rate.

27. The apparatus of claim 23, wherein the data rate determiner is to determine the data rate based at least in part on a WLAN time window provided by the type of BT device and at least in part on a parameter from the group consisting of: a medium access control (MAC) packet data unit (MPDU) size and a size of a fragment of a medium access control (MAC) packet data unit.

28. The apparatus of claim 27, wherein the data rate determiner is to determine the data rate as a threshold data rate to transfer the MPDU/fragment over the second wireless communications link during the WLAN time window.

29. The apparatus of claim 28, further comprising:
an MPDU fragmentation manager to set the size of the fragment based at least in part on a current WLAN data rate for the second wireless communications link.

30. A non-transitory computer-readable medium storing computer-executable code for wireless communications, the code executable by a processor to:
determine by a first device a type of a second device coupled to the first device by a first wireless communications link, wherein the first device also is coupled to a third device by a second wireless communications link;
determining a data rate of the second device based at least in part on the type of the second device; and
set a roaming threshold value for the second wireless communications link based at least in part on the data rate of the type of the second device, wherein the roaming threshold value is to be used for determining whether the first device should attempt to roam from the second wireless communications link.

* * * * *